United States Patent Office 2,774,755
Patented Dec. 18, 1956

2,774,755

ACID AMIDE DERIVATIVES OF AZO-DYESTUFFS

Max Schmid, Riehen, and Eduard Moser and Christoph Frey, Basel, Switzerland, assignors to Ciba Limited, Basel, Switzerland, a Swiss firm No Drawing. Application December 14, 1953,
Serial No. 398,226

Claims priority, application Switzerland
December 24, 1952

5 Claims. (Cl. 260—174)

This invention provides valuable new acid amide derivatives of azo-dyestuffs, which derivatives are free from groups imparting solubility and contain the radical of an amine having at least two acylated amino groups, at least one of the acyl radicals being derived from a carboxylic acid of an azo-compound of which the azo linkage is bound to an aryl nucleus, which contains a carboxylic acid ester group in a position vicinal to the azo linkage.

The invention also provides a process for making the above acid amide derivatives, wherein an amine which is free from groups imparting solubility in water and which contains at least two reactive amino groups is condensed at each of the amino groups with a carboxylic acid halide free from groups imparting solubility in water, and at least one of the amino groups is condensed with a carboxylic acid halide of an azo compound of which the azo linkage is bound to an aryl nucleus which contains a carboxylic acid ester group in a position vicinal to the azo linkage.

In the process of the invention there are used starting materials which are free from groups imparting solubility in water such as sulfonic acid groups, sulfonic acid amide groups and carboxylic acid groups. The amines used as starting materials must contain at least two reactive, that is to say, primary or secondary, amino groups. Good results are obtained with non-vattable aromatic diamines, for example, those containing only carbocyclic aromatic rings and at the most 4 rings of this kind. As such diamines there may be mentioned mono-nuclear diamines such as 1:4-diaminobenzene, 1:4-diamino-2:5-dialkoxybenzenes and 1:4-diaminobenzenes which may contain various substituents in the 2- and 5-positions, such as nitro groups, halogen atoms, alkoxy groups or alkyl groups.

In many cases especially good results are obtained by using binuclear or polynuclear amines, for example, by using 4:4'-diaminodiphenyl and derivatives thereof, such for example, as 3:3'-dichloro-, 3:3'-dimethyl-, 3:3'-dialkoxy-4:4'-diaminodiphenyl, 3:5:3':5' - tetrachloro-4:4'-diaminodiphenyl and 3:5:3':5'-tetramethyl-4:4'-diaminodiphenyl. In general valuable acid amide derivatives are also obtained by using diamines of the benzene series, in which two identical or different benzene nuclei are connected together by a suitable bridging member, for example, by oxygen, or —SO₂— as in the case of 4:4'-diaminodiphenylsulfone, 3:3' - diamino-4:4' - dichlorodiphenylsulfone and 3:3'-diamino-4:4'-dimethoxydiphenylsulfone; or by —CO— as in the case of 3:3'-diaminodiphenyl ketone, 3:3'-diamino-4:4'-dimethoxydiphenyl diketone; or by —CH₂— as in the case of 3:3'-diaminodiphenylmethane, 3:3' - diamino-4:4' - dichlorodiphenylmethane, 4:4'-diamino-3:3' - dichlorodiphenyl methane, 4:4' - diamino - 3:5:3':5' - tetrachlorodiphenyl - methane; or by —NHCO—, NHCONH—, —SO₂NH—, —CH=CH—, —CH₂—CH₂—,
—HN—CO—C₂H₄—CO—

—NH— or —N=N—. Finally there may be used diamines of quite a different kind, for example, 2:8-diaminochrysene, 4:11-diaminofluoranthene, 2:6- or 1:5-diaminonaphthalenes, diaminobenzthiazoles such as 2-(4'-aminophenyl)-6-aminobenzthiazole.

There may also be used monamines or diamines containing secondary amino groups, advantageously N-alkyl-arylamines or di-(N-alkylamino)-aryl compounds, such as 4:4' - di-(methylamino)-diphenyl or 4:4' - di-(methylamino)-diphenyl sulfone.

The carboxylic acid halides serving as starting materials in the present process may be prepared by treating with an acid halide forming agent an azo-compound, of which the azo linkage is bound to an aryl nucleus containing a carboxylic acid ester group in ortho-position to the azo linkage and which azo-compound contains as the sole group imparting solubility a free carboxylic acid group. Advantageously these azo-compounds contain a single azo group, and they are advantageously prepared by coupling a diazotized amine of the naphthalene series or advantageously of the benzene series, which contains a carboxylic acid ester group in a position vicinal to the diazotized amino group, with a coupling component containing a carboxylic acid group as a substituent.

The carboxylic acid ester group may, for example, be a carboxylic acid aryl ester group, for example, a carboxylic acid phenyl ester group of which the phenyl nucleus may contain as further substituents alkyl groups such as methyl or ethyl, alkoxy groups such as methoxy or ethoxy or halogen atoms such as chlorine. Of special interest are diazo-components which contain carboxylic acid alkyl ester groups, especially those containing alkyl radicals of low molecular weight such as a carboxylic acid methyl, ethyl, n-propyl, isopropyl or butyl ester group. As examples of diazo components containing carboxylic acid ester groups there may be mentioned, for example, 1-aminobenzene - 2 - carboxylic acid phenyl ester, 1 - aminobenzene - 2 - carboxylic acid 4' - chlorophenyl ester, 1 - aminobenzene - 2 - carboxylic acid methyl or ethyl ester, 1 - aminobenzene - 2 - carboxylic acid n-butyl ester, 1 - amino - 4 - or -5-chlorobenzene-2-carboxylic acid methyl ester, 1 - amino - 4:6 - dichlorobenzene - 2 - carboxylic acid methyl ester, 2 - aminonaphthalene - 3 - carboxylic acid methyl ester and 2-aminonaphthalene - 3 carboxylic acid ethyl ester.

For the preparation of the carboxylic acids containing azo linkages the above mentioned or other amines of the kind described above may be coupled with any desired carboxylic acids, but advantageously with those capable of coupling in a position vicinal to a hydroxyl group, for example, hydroxy-carbazole carboxylic acids, especially 2-hydroxycarbazole-3-carboxylic acid and N-alkyl-derivatives thereof, 2-hydroxyanthracene-3-carboxylic acid, and also 3-hydroxydiphenylene oxide-2-carboxylic acids or 3-hydroxy-diphenylene sulfide-2-carboxylic acid. As coupling components there may also be used open-chain or heterocyclic compounds containing enolizable keto groups, with the use of which it is generally recognized that after coupling they are present in the enol form, that is to say they contain a hydroxyl group in a position vicinal to the azo linkage. Among coupling components of this kind there are especially suitable pyrazolone carboxylic acids, for example, 1-aryl-5-pyrazolone-3-carboxylic acids or aryl-pyrazolones, which contain a carboxyl group bound to the aryl radical; and as examples there may be mentioned 1-phenyl-5-pyrazolone-3-carboxylic acid and also 1-phenyl-3-methyl-5-pyrazolone-4'-carboxylic acid. As open-chain coupling components containing enolizable keto groups there may be mentioned arylides of β-keto-carboxylic acids containing carboxyl groups such, for example, as 1-acetoacetylamino-benzene- 2- or 3- or 4-carboxylic acid and 1-benzoylacetylamino-benzene-3- or -4-carboxylic acid.

However, especially valuable results are obtained by using 2-hydroxynaphthalene-3-carboxylic acid as coupling component.

For the preparation of the carboxylic acid halides serving as starting materials in the present process the above carboxylic acids containing azo linkages are treated with acid halide forming agents. As acid halide forming agents there are to be understood those which are capable of converting carboxylic acids into their acid halides, for example, the bromides or chlorides; there are to be mentioned especially phosphorus halides, such as phosphorus pentabromide, phosphorus trichloride or phosphorus pentachloride, and phosphorus oxyhalides. There are advantageously used acid chloride forming agents, that is to say, those which are capable of converting the carboxylic acids into the corresponding acid chlorides, such as phosphorus pentachloride or thionyl chloride.

The treatment with the agents capable of forming acid halides is advantageously carried out in an inert organic solvent, such as dimethyl-formamide or chlorobenzenes, for example, mono- or di-chlorobenzene, toluene, xylene, benzene or nitrobenzene.

For the preparation of such acid halides it is usually of advantage first to dry azo-compounds prepared in an aqueous medium or to free them from water by boiling azeotropically in an organic solvent. The azeotropic drying may, if desired, immediately precede the treatment with the halogenating agent.

In accordance with the present process the acid halides obtainable as described above are reacted with amines, which contain at least two reactive amino groups.

For example, 1 mol of a diamine may be condensed with 1 mol of a carboxylic acid halide of an azo-compound containing a carboxylic acid ester group and with 1 mol of another acid halide free from groups imparting solubility and having any desired constitution, and which is free from or contains an azo linkage. However, it is generally desirable to condense a diamine at each of the amino groups with a carboxylic acid halide of an azo-compound which contains a carboxylic acid ester group, and, in the interests of uniformity and ease of control of the course of the reaction, it has been found advantageous to condense 1 mol of a diamine with 2 mols of a single acid halide having the constitution given above.

The condensation of the carboxylic acid halides with the amines is advantageously conducted in an anhydrous medium. Under these conditions the condensation generally takes place surprisingly easily even at temperatures within the boiling range of normal organic solvents such as dimethyl-formamide, toluene, monochlorobenzene, dichlorobenzene, trichlorobenzene, nitrobenzene and the like. In order to accelerate the reaction it is generally of advantage to remove the hydrogen halide formed in the condensation, for example, by continuous distillation, boiling under reflux or by the addition of an acid-binding agent, such as anhydrous sodium acetate, pyridine or anhydrous ammonia. The resulting dyestuffs are generally obtained in very good yield and in a pure state. In may be of advantage, in order to prepare especially pure dyestuffs, previously to isolate the acid chlorides obtained from the carboxylic acids and, if desired, to recrystallize the acid chlorides. In some cases, however, the isolation of the acid chloride may be dispensed with without impairing the results, and then the condensation may directly follow the preparation of the acid chloride.

The new acid amide derivatives of azo-compounds obtained by the present process are free from groups imparting solubility, and contain the radical of an amine having two acylated amino groups, at least one of which acyl radicals is that of a carboxylic acid of an azo-compound of which the azo linkage is bound to an aryl nucleus containing a carboxylic acid ester group in ortho-position to the azo linkage. As will be understood from the foregoing description, there are of special interest those acid amide derivatives which correspond to the general formula $$R_1—N=N—R_2—CO—HN—R_3—NH—OC—R_2—N=N—R_1$$

in which $R_1$ represents a radical of the benzene or naphthalene series containing a carboxlic acid ester group as a substituent in a position vicinal to the azo linkage, $—R_2—CO—$ represents the radical of a coupling component containing a hydroxyl group and bound to the azo linkage in a position vicinal to the hydroxyl group, and $—HN—R_3—NH—$ represents the radical of an aromatic diamine.

The new acid amide derivatives are valuable pigments. They are especially suitable for coloring polyvinyl compounds, for example, by being incorporated during rolling into polyvinyl foils, and they are in general distinguished by an especially good fastness to light and migration, and also by their resistance to heat and solvents. This is also of value for the so-called pigment printing, that is to say, for printing processes which depend on fixing pigments by means of suitable adhesives such as casein, hardening artificial materials, especially urea-formaldehyde or melamine-formaldehyde condensation products, polyvinyl chloride or polyvinyl acetate solutions or emulsions, or other emulsions (for example, oil-in-water or water-in-oil emulsions), on a substratum, especially on a textile fiber or on another sheet-like structure such as paper (for example, wallpapers) or fabrics of glass fibers. The pigments obtained by the present process are also well suited for other purposes, for example, in a finely dispersed form for coloring artificial silk or viscose or cellulose ethers or esters or superpolyamides or superpolyurethanes in the spinning mass, and also for preparing colored lacquers or lacquer formers, solutions and products from acetyl-cellulose, nitrocellulose, natural resins or artificial resins, such as polymerisation or condensation resins, for example, aminoplasts, phenoplasts, polystyrene, polyethylene, polyacryl, rubber casein, silicones or silicone resins.

Preparations which contain such pigments in a finely dispersed form, can be prepared in known manner by intensive mechanical treatment, for example, on roller mills or in suitable kneading apparatus. The choice of the dispersing medium enabling the intensive mechanical treatment to be performed depends on the purpose in view, for example for making preparations capable of being dispersed in water there may be used sulfite cellulose waste liquor or salts of naphthylmethane-disulfonic acid, and for making cellulose acetate artificial silk spinning preparations there may be used acetyl-cellulose mixed with a small amount of a solvent.

By virtue of the especially favorable physical form in which the products of the invention are generally obtained, and by virtue of their chemical inertness and good heat resistance, they can be easily dispersed in the normal manner in masses or preparations of the kind described above, and they are advantageously so dispersed at a stage in which the masses or preparations have not yet reached their final shape. The operations necessary for shaping, such as spinning, pressing, hardening, casting, adhesion or the like, can then be carried out in the presence of the pigment without preventing any chemical reactions of the substratum such as further polymerisation, condensation, etc.

The following examples illustrate the invention, the parts and percentages being by weight unless otherwise stated and the relationship of parts by weight to parts by volume being the same as that of the kilogram to the liter:

*Example 1*

70 parts of the monoazo-dyestuff from diazotized 1- aminobenzene-2-carboxylic acid methyl ester and 2-hydroxynaphthalene-3-carboxylic acid of the formula

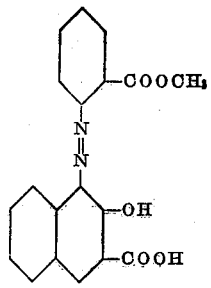

are introduced, while stirring, into 500 parts of chlorobenzene. 20 parts of thionyl chloride are added to the mixture and the whole is heated at a gentle boil. After about ½ hour the acid chloride of the dyestuff dissolves. The whole is stirred at the boil for about 2 hours longer and then allowed to cool. The crystalline acid chloride which precipitates is filtered off with suction, and washed with a small amount of cold chlorobenzene and dried in vacuo at 70–80° C. The acid chloride melts at 205–206° C.

73.7 parts of the acid chloride so obtained are introduced into 2000 parts of dry chlorobenzene and 20 parts of pyridine. 10.8 parts of 1:4-diaminobenzene are added to the mixture, and the whole is heated at the boil, while stirring, for about 24 hours. When the condensation ceases the pigment so formed is filtered off while hot, then washed with warm chlorobenzene and subsequently with hot alcohol, and dried. The resulting disazo-dyestuff of the formula

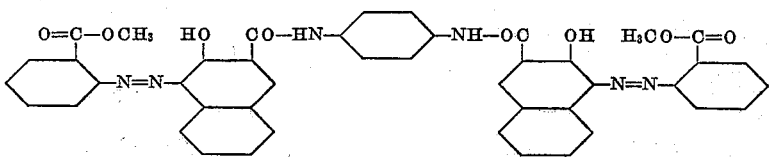

is a red-brown pigment which is sparingly soluble to insoluble in the usual solvents and, when incorporated by rolling into polyvinyl chloride foils yields strong red-brown tints of good fastness to migration and light. The pigment dissolves in concentrated sulfuric acid with a red-violet coloration.

The above mentioned monoazo-dyestuff is prepared as follows:

30.2 parts of 1-aminobenzene-2-carboxylic acid methyl ester are introduced into 300 parts of water and 58 parts of hydrochloric acid of 30 percent strength, and the mixture is stirred for about ½ hour in order to form the hydrochloride. The mixture is then cooled with ice to 0° C., and 50 parts by volume of a 4N-solution of sodium nitrite at 0–5° C. is run in through a dropping funnel below the surface of the liquid. The whole is stirred for a further ½ hour until the diazotization is finished and dissolution is almost complete, and the nearly colorless diazo-solution is then filtered. The diazo-solution is run at 0–10° C. into a filtered solution of 37.6 parts of 2-hydroxynaphthalene-3-carboxylic acid in 500 parts of water, 28 parts of sodium hydroxide solution of 30 percent strength and 40 parts of sodium carbonate. The whole is further stirred until the coupling is finished, and is then filtered and the filter residue is washed with water. The filter residue is suspended in 1500 parts of cold water and, in order to form the free dyestuff acid, is mixed with about 58 parts of hydrochloric acid of 30 percent strength (until the reaction is acid to Congo). The whole is stirred for about 3 hours longer at room temperature, filtered, and the filter residue is washed with cold water until neutral to Congo. The dried and ground disazo-dyestuff of the above formula is a red powder, which dissolves very sparingly in alkaline aqueous solutions with an orange coloration. The dyestuff dissolves in concentrated sulfuric acid with a red-violet coloration.

*Example 2*

70 parts of the monoazo-dyestuff obtained as described in Example 1 from diazotized 1-aminobenzene-2-carboxylic acid methyl ester and 2-hydroxynaphthalene-3-carboxylic acid are converted into the chloride of the dyestuff acid as described in Example 1.

73.7 parts of the acid chloride so obtained are introduced into 2000 parts of dry chlorobenzene and 20 parts of pyridine. 25.3 parts of 3:3'-dichloro-4:4'-diaminodiphenyl are added to the mixture, and the whole is heated at the boil while stirring, for about 24 hours. When the condensation ceases the pigment formed is filtered off while hot, washed with warm chlorobenzene and subsequently with hot alcohol, and dried. If desired, in order to remove the last traces of the organic solvent, such as chlorobenzene, which often persistently adheres to the finely dispersed pigment, the product may be subjected to distillation with steam before the drying operation. The resulting disazo-dyestuff of the formula

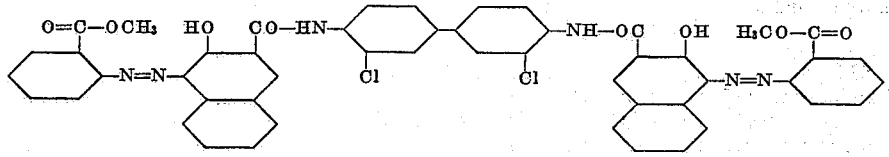

is a red powder which is sparingly soluble to insoluble in the usual solvents and, when incorporated by rolling into polyvinyl chloride foils yields strong scarlet red tints of good fastness to migration and light. The pigment dissolves in concentrated sulfuric acid with a red-violet coloration.

*Example 3*

76.9 parts of the dyestuff from diazotized 4-chloro-1-aminobenzene-2-carboxylic acid methyl ester and 2-hydroxynaphthalene-3-carboxylic acid are introduced, while stirring, in 1000 parts of nitrobenzene. 20 parts of thionyl chloride are added to the mixture, and the whole is heated at 130–150° C. After about ½ hour the acid chloride dissolves. The whole is stirred for about 2 hours longer at 130–150° C. and then allowed to cool. The crystalline precipitated chloride of the acid deystuff is filtered off with suction and washed with a small amount of cold benzene, and dried in vacuo at 70–80° C. The acid chloride melts at 227–228° C.

80.6 parts of the acid chloride so obtained are introduced into 2000 parts of dry chlorobenzene and 20 parts of pyridine. 25.3 parts of 3:3'-dichloro-4:4'-diaminodiphenyl are added to the mixture, and the whole is heated at the boil, while stirring, for about 24 hours. When the condensation has ceased, the pigment formed is filtered off while hot, washed with warm chlorobenzene and then with hot alcohol, and dried. The resulting disazo-dyestuff of the formula

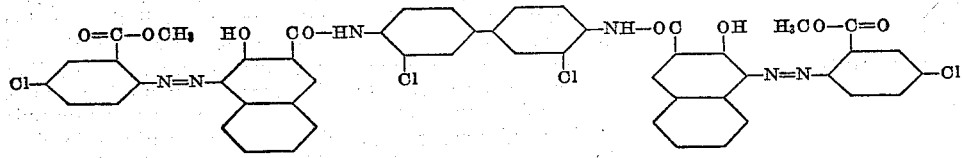

is a red-orange pigment, which is sparingly soluble to insoluble in the usual solvents and, when incorporated by rolling into polyvinyl chloride foils, yields strong red-orange tints of good fastness to migration and light. The pigment dissolves in concentrated sulfuric acid with a violet coloration.

By using in this example 3:3'-dimethyl-4:4'-diaminodiphenyl, instead of 3:3'-dichloro-4:4'-diaminodiphenyl, the condensation dyestuff of the formula

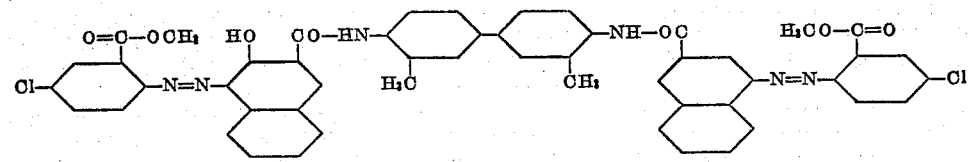

is obtained in the form of a dark brown pigment, which is sparingly soluble to insoluble in the usual solvents and, when incorporated by rolling into polyvinyl chloride foils, yields strong brown tints of good fastness to migration and light.

Example 4

83.8 parts of the dyestuff from diazotized 4:6-dichloro-1-aminobenzene-2-carboxylic acid methyl ester and 2-hydroxynaphthalene-3-carboxylic acid are introduced, while stirring, into 500 parts of chlorobenzene. 20 parts of thionyl chloride are added to the mixture, and the whole is heated to the boil. After boiling for about ½ hour the acid chloride of the dyestuff dissolves. The whole is stirred for a further 2 hours at the boil and allowed to cool. The precipitated product is filtered off with suction, and washed with a small amount of cold chlorobenzene and dried in vacuo at 70–80° C. The acid chloride melts at 210–211° C.

87.5 parts of the acid chloride so obtained are introduced into 2000 parts of dry chlorobenzene and 20 parts of pyridine. 18.4 parts of 4:4'-diaminodiphenyl are added to the mixture, and the whole is stirred at the boil, while stirring, for about 24 hours. When the condensation has ceased, the pigment formed is filtered off while hot, washed with warm chlorobenzene and then with hot alcohol, and dried. The disazo-dyestuff of the formula

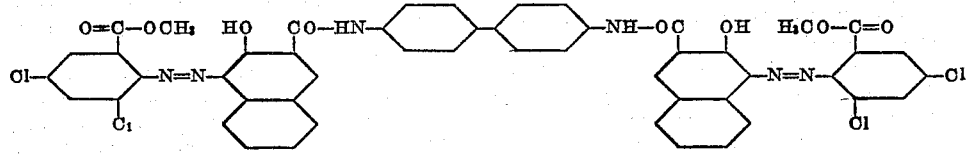

is a red-orange pigment, which is sparingly soluble to insoluble in the usual solvents and, when incorporated by rolling into polyvinyl chloride foils, yields strong red-orange tints of good fastness to migration and light. The pigment dissolves in concentrated sulfuric acid with a violet coloration.

Example 5

80.1 parts of the dyestuff from diazotized 1-aminobenzene-2-carboxylic acid methyl ester and 1-(2'-chlorophenyl)-5-pyrazolone-3-carboxylic acid are introduced, while stirring into 800 parts of chlorobenzene. 20 parts of thionyl chloride are added to the mixture and the whole is heated to a gentle boil. After about ½ hour the acid chloride of the dyestuff dissolves. The whole is stirred for a further 2 hours at the boil, and is then allowed to cool. The precipitated product is filtered off with suction, and washed with a small amount of cold chlorobenzene and dried in vacuo at 70–80° C. The acid chloride melts at 208–209° C.

83.8 parts of the acid chloride so obtained are introduced into 2000 parts of dry chlorobenzene and 20 parts of pyridine. 18.4 parts of 4:4'-diaminodiphenyl are added to the mixture, and the whole is heated at the boil, while stirring for about 24 hours. When the condensation has ceased, the pigment formed is filtered off with suction while hot, washed with warm chlorobenzene and then with hot alcohol, and dried. The disazo-dyestuff of the formula

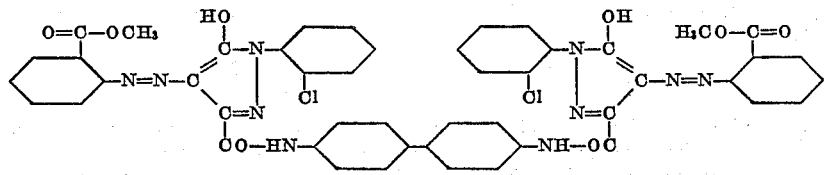

is a greenish yellow pigment, which is sparingly soluble to insoluble in the usual solvents and, when incorporated by rolling in polyvinyl chloride foils, yields strong greenish yellow tints of good fastness to migration and light. The pigment dissolves in concentrated sulfuric acid with an orange coloration.

In the following table are given further valuable pigments which can be obtained in the manner described in the foregoing examples by condensing (in the molecular ratio 2:1) of the monoazo-dyestuffs obtainable from the diazo components given in column I and the coupling components given in column II, with the diamines given in column III:

| | I<br>Diazo Components | II<br>Coupling Components | III<br>Diamines | IV<br>Color obtained by rolling the pigment into polyvinyl chloride foils |
|---|---|---|---|---|
| 1 | 1-aminobenzene-2-carboxylic acid methyl ester | 2-hydroxynaphthalene-3-carboxylic acid | 3:3'-dimethyl-4:4'-diamino-diphenyl | rust red. |
| 2 | do | do | 1:5-diamino-naphthalene | brownish orange. |
| 3 | 1-aminobenzene-2-carboxylic acid ethyl ester | do | 4:4'-diamino-benzene | pure, yellowish red. |
| 4 | do | do | 3:3'-dimethyl-4:4'-diamino-diphenyl | brownish bordeaux. |
| 5 | do | do | 3:3'-dichloro-4:4'-diamino-diphenyl | scarlet. |
| 6 | do | do | 1:5-diamino-naphthalene | reddish orange. |
| 7 | 4-chloro-1-aminobenzene-2-carboxylic acid methyl ester | do | 4:4'-diamino-diphenyl | pure, yellowish scarlet. |
| 8 | do | do | 1:4-diamino-benzene | yellowish red. |
| 9 | do | do | 1:5-diamino-naphthalene | bluish red. |
| 10 | do | do | 3:3'-dimethoxy-4:4'-diamino-diphenyl | brownish red. |
| 11 | 5-chloro-1-amino-benzene-2-carboxylic acid methyl ester | do | 4:4'-diamino-diphenyl | bright scarlet. |
| 12 | do | do | 3:3'-dimethyl-4:4'-diamino-diphenyl | brown. |
| 13 | 5-chloro-2-amino-benzene-1-carboxylic acid methyl ester | do | 3:3'-dichloro-4:4'-diamino-diphenyl | yellowish, pure red. |
| 14 | 4:6-dichloro-1-aminobenzene-2-carboxylic acid methyl ester | do | 1:4-diamino-benzene | pure, yellowish scarlet. |
| 15 | do | do | 1:5-diamino-naphthalene | yellowish brown. |
| 16 | 2-aminonaphthalene-3-carboxylic acid ethyl ester | do | 3:3'-dimethyl-4:4'-diamino-diphenyl | brownish bordeaux. |
| 17 | 1-aminobenzene-2-carboxylic acid methyl ester | 1-phenyl-5-pyrazolone-3-carboxylic acid | 4:4'-diamino-diphenyl | reddish yellow. |
| 18 | do | 1-(2'-chlorophenyl)-5-pyrazolone-3-carboxylic acid | 3:3'-dimethyl-4:4'-diamino-diphenyl | Do. |
| 19 | 1-aminobenzene-2-carboxylic acid ethyl ester | 1-phenyl-3-methyl-5-pyrazolone-4'-carboxylic acid | 1:4-diamino-benzene | yellow. |
| 20 | do | do | 3:3'-dichloro-4:4'-diamino-diphenyl | orange yellow. |
| 21 | do | do | 1:5-diamino-naphthalene | greenish yellow. |
| 22 | 4-chloro-1-aminobenzene-2-carboxylic acid methyl ester | do | 4:4'-diamino-diphenyl | yellow. |
| 23 | do | do | 3:3'-dimethyl-4:4'-diamino-diphenyl | Do. |
| 24 | do | do | 3:3'-dichloro-4:4'-diamino-diphenyl | Do. |
| 25 | 5-chloro-1-aminobenzene-2-carboxylic acid methyl ester | do | do | greenish yellow. |
| 26 | 4:6-dichloro-1-aminobenzene-2-carboxylic acid methyl ester | do | 4:4'-diamino-diphenyl | yellow. |
| 27 | 1-aminobenzene-2-carboxylic acid-n-butyl ester | do | 3:3'-dichloro-4:4'-diamino-diphenyl | Do. |
| 28 | 1-aminobenzene-2-carboxylic acid methyl ester | 2-hydroxynaphthalene-3-carboxylic acid | di-(p-aminobenzenesulfo)-imine | ruby. |
| 29 | do | do | 1:3-diamino-4:6-dimethylbenzene | Scarlet. |
| 30 | do | do | 1:3-diamino-benzene | Orange. |
| 31 | do | do | 1:4-diamino-2:5-dichloro-benzene | Scarlet. |
| 32 | do | do | 1:4-diamino-2:5-diethoxy-benzene | Yellowish brown. |
| 33 | do | do | 1:6-di-(p-aminobenzoyl-amino)-n-hexane | Yellowish scarlet. |
| 34 | do | do | 3:3'-dimethoxy-4:4'-diamino-6:6'-dimethyl-1:1'-azobenzene | Reddish brown. |
| 35 | do | do | 4:11-diamino-fluoranthrene | Bluish red. |
| 36 | do | do | 3:6:3':6'-tetrachloro-4:4'-diamino-diphenylmethane | Yellowish orange. |
| 37 | do | do | 2:2'-dichloro-4:4'-diamino-diphenylmethane | Red. |
| 38 | do | do | 3:8-diamino-pyrene | Brown. |
| 39 | do | do | 4:4'-diamino-1:1'-azobenzene | Scarlet. |
| 40 | do | do | 4:4'-diaminodiphenyl-urea | Do. |
| 41 | do | do | 4:4'-diaminodiphenylsulfone | Do. |
| 42 | do | do | 2:8-diamino-chrysene | Yellowish brown. |
| 43 | do | do | 4-aminobenzene-1-carboxylic acid-4'-amino phenyl ester | Reddish orange. |
| 44 | 1-aminobenzene-2-carboxylic acid phenyl ester | do | 4:4'-diamino-diphenyl | Scarlet. |
| 45 | do | do | 3:3'-dichloro-4:4'-diamino-diphenyl | Do. |
| 46 | do | do | 1:4-diamino-benzene | Maroon. |
| 47 | 1-aminobenzene-2-carboxylic acid methyl ester | 2,hydroxycarbazole-3-carboxylic acid | 4:4'-diamino-diphenyl | Brown. |
| 48 | do | 2-hydroxycarbazole-3-carboxylic acid | 2:4-diamino-1-methyl-benzene | Do. |
| 49 | do | hydroxycarboxylic acid of the formula—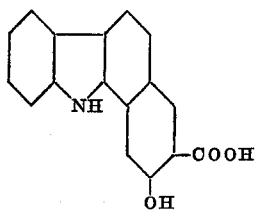 | 4:4'-diamino-diphenyl | Bordeaux. |
| 50 | do | do | 1:4-diamino-benzene | Do. |
| 51 | do | 3-hydroxydiphenylene-oxide-2-carboxylic acid | 3:3'-dichloro-4:4'-diamino-diphenyl | Brown. |
| 52 | do | do | 4:4'-diamino-diphenylether | Do. |
| 53 | do | 3-acetoacetyl-amino-4-chlorobenzene-1-carboxylic acid | 3:3'-dichloro-4:4',diamino-diphenyl | Yellow. |
| 54 | do | do | 1:4-diamino-benzene | Do. |
| 55 | 2-aminonaphthalene-3-carboxylic acid ethyl ester | 2-hydroxynaphthalene-3-carboxylic acid | 3:3'-dichloro-4:4'-diamino-diphenyl | Red. |
| 56 | 1-aminobenzene-2-carboxylic acid methyl ester | do | 4:4'-diamino-diphenyl | Do. |
| 57 | 4-chloro-1-aminobenzene-2-carboxylic acid methyl ester | 3-acetoacetylamino-4-methoxy-benzene-1-carboxylic acid | 3:3'-dichloro-4:4'-diamino-diphenyl | Yellow. |

Example 6

65 parts of polyvinyl chloride, 35 parts of dioctylphthalate and 1 part of the dyestuff obtained as described in Example 1 are stirred together, and then rolled to and fro in a 2-roller calender for 7 minutes at 140° C. There is obtained a reddish brown colored foil of which the tint is very fast to light and dyestuff migration.

What is claimed is:

1. An acid amide derivative of an azo compound which derivative is free from groups imparting solubility in water and corresponds to the formula

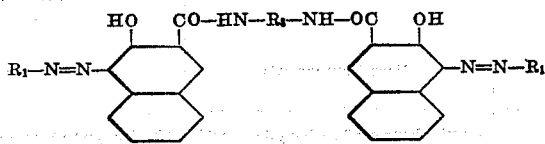

in which $R_1$ represents a member selected from the group consisting of mononuclear aromatic radicals of the benzene series and binuclear aromatic radicals of the naphthalene series and contains a carboxylic acid ester group in vicinal position to the azo linkage, and $R_3$ represents an aromatic hydrocarbon radical containing $6n$ ring carbon atoms, $n$ representing a whole number of at the most 2.

2. The acid amide derivative of the formula

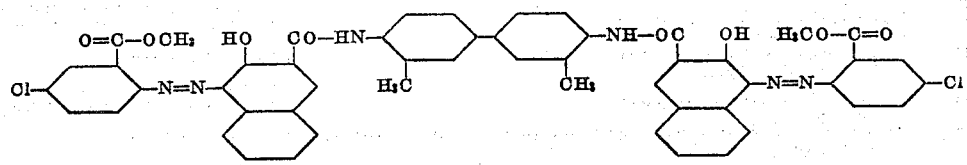

3. The acid amide derivative of the formula

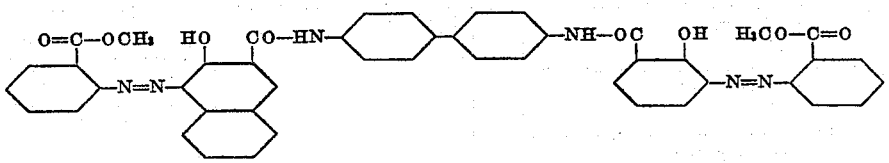

4. The acid amide derivative of the formula

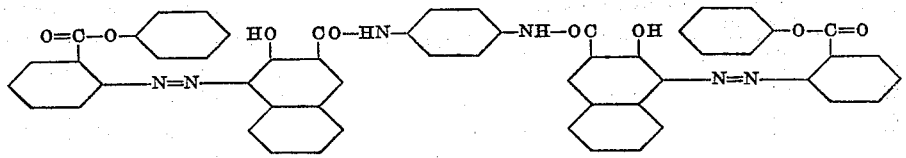

5. The acid amide derivative of the formula

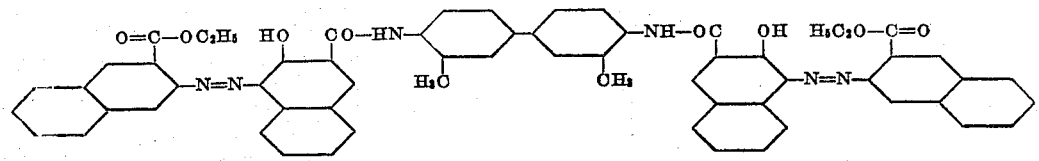

References Cited in the file of this patent

UNITED STATES PATENTS 1,999,438   Bonhote et al. _____ Apr. 30, 1935